US012626641B2

(12) United States Patent
Lin

(10) Patent No.: US 12,626,641 B2
(45) Date of Patent: May 12, 2026

(54) DISPLAY PANEL

(71) Applicant: Innolux Corporation, Miaoli County (TW)

(72) Inventor: Chun-Hsien Lin, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/620,997

(22) Filed: Mar. 28, 2024

(65) Prior Publication Data

US 2024/0265855 A1 Aug. 8, 2024

Related U.S. Application Data

(63) Continuation of application No. 17/838,273, filed on Jun. 13, 2022, now abandoned.

(51) Int. Cl.
*G09G 3/32* (2016.01)

(52) U.S. Cl.
CPC ......... *G09G 3/32* (2013.01); *G09G 2300/026* (2013.01); *G09G 2310/0278* (2013.01)

(58) Field of Classification Search
CPC ............... G09G 3/32; G09G 2300/026; G09G 2310/0278; G09G 2300/0426; G09G 2300/0819; G09G 2300/0842; G09G 2300/0861; G09G 2320/0295; G09G 2330/12; H10K 59/126
See application file for complete search history.

(56) References Cited

U.S. PATENT DOCUMENTS

| | | | | |
|---|---|---|---|---|
| 6,014,193 A * | 1/2000 | Taira | G02F 1/13336 | 349/110 |
| 6,999,045 B2 * | 2/2006 | Cok | G06F 3/1446 | 345/1.3 |
| 7,812,794 B2 * | 10/2010 | Fukumoto | G09G 3/3275 | 345/82 |

(Continued)

FOREIGN PATENT DOCUMENTS

| | | |
|---|---|---|
| CN | 105742457 | 7/2016 |
| CN | 111816126 | 10/2020 |

OTHER PUBLICATIONS

"Office Action of China Counterpart Application", issued on Apr. 23, 2024, p. 1-p. 9.

*Primary Examiner* — Michael J Jansen, II
(74) *Attorney, Agent, or Firm* — JCIPRNET

(57) ABSTRACT

Disclosed is a display panel including a substrate, a light-emitting unit, a pixel circuit, a scan driver, and an emission driver. The light-emitting unit is arranged on the substrate. The pixel circuit is arranged on the substrate. The pixel circuit includes a data input transistor, a driving transistor, and an emission transistor. The data input transistor is configured to receive a data signal according to a scan signal. The driving transistor is configured to provide a driving current based on the data signal. The emission transistor is configured to transfer the driving current to the light-emitting unit according to an emission signal. The scan driver is arranged on the substrate and is configured to output the scan signal. The emission driver is arranged on the substrate and is configured to output the emission signal. The pixel circuit is arranged between the scan driver and the emission driver.

9 Claims, 11 Drawing Sheets

(56) References Cited

U.S. PATENT DOCUMENTS 8,179,336 B2* 5/2012 Hamer ..................... G09G 3/20
345/1.3
9,171,499 B2* 10/2015 Park ..................... G09G 3/3225
9,384,687 B2* 7/2016 Lee ..................... H10K 59/131
9,685,131 B2* 6/2017 Tanaka ..................... G02F 1/1345
9,704,429 B2* 7/2017 Seo ..................... G09G 3/2085
9,711,083 B2* 7/2017 Kim ..................... G09G 3/3233
9,779,665 B2* 10/2017 Song ..................... G09G 3/3233
9,798,339 B2* 10/2017 Tanaka ..................... G09G 3/3677
9,910,530 B2* 3/2018 Aoyama ..................... G06F 3/0443
10,004,124 B1* 6/2018 Ko ..................... H05B 33/10
10,032,839 B2* 7/2018 Kang ..................... G09G 3/3266
10,191,344 B2* 1/2019 Noma ..................... G02F 1/13454
10,332,458 B2* 6/2019 Eguchi ..................... G02B 26/0833
10,395,589 B1* 8/2019 Vahid Far ..................... G09G 3/3208
10,410,594 B2* 9/2019 Yonebayashi ..................... G09G 3/20
10,510,286 B2* 12/2019 Aoyagi ..................... G09G 3/2085
10,627,688 B2* 4/2020 Nishiyama ..................... G02F 1/13454
10,634,968 B2* 4/2020 Noma ..................... G09F 9/00
10,777,758 B2* 9/2020 Okazaki ..................... G09F 9/00
10,809,581 B2* 10/2020 Nishiyama ..................... G09G 3/3611
10,832,615 B2* 11/2020 Kim ..................... H01L 25/0753
10,861,389 B2* 12/2020 Lin ..................... G09G 3/3258
10,930,220 B2* 2/2021 Park ..................... G09G 3/3233
10,935,859 B2* 3/2021 Nishiyama ..................... G02F 1/136286
10,983,381 B2* 4/2021 Jeong ..................... G09G 3/32
11,489,037 B2* 11/2022 Bower ..................... G06F 3/147
11,514,834 B2* 11/2022 Jeong ..................... G09G 3/2085
12,262,612 B2* 3/2025 Shin ..................... H10K 59/18
2004/0008155 A1* 1/2004 Cok ..................... G06F 3/1446
345/1.3
2006/0158393 A1* 7/2006 Fukumoto ..................... G09G 3/3275
345/76
2009/0322649 A1* 12/2009 Hamer ..................... G09G 3/2085
345/1.3
2013/0002736 A1* 1/2013 Park ..................... G09G 3/3225
345/691
2014/0176399 A1* 6/2014 Lee ..................... G09G 3/20
345/55
2015/0103103 A1* 4/2015 Kim ..................... G09G 3/3233
345/690
2015/0293546 A1* 10/2015 Tanaka ..................... G02F 1/136286
327/541
2016/0019856 A1* 1/2016 Tanaka ..................... G09G 3/3666
345/206
2016/0240144 A1* 8/2016 Song ..................... G09G 3/3266
2016/0253023 A1* 9/2016 Aoyama ..................... G06F 3/047
345/174
2016/0267831 A1* 9/2016 Seo ..................... G09G 3/2085
2017/0025070 A1* 1/2017 Kang ..................... G09G 3/3233
2017/0255049 A1* 9/2017 Nishiyama ..................... G09G 3/3611
2017/0255074 A1* 9/2017 Nishiyama ..................... G02F 1/13624
2017/0261828 A1* 9/2017 Noma ..................... G09G 3/3677
2017/0287387 A1* 10/2017 Eguchi ..................... G09G 3/3413
2017/0337887 A1* 11/2017 Yonebayashi ..................... G09G 3/3677
2018/0218668 A1* 8/2018 Aoyagi ..................... G09G 3/32
2019/0334104 A1* 10/2019 Okazaki ..................... G09F 9/00
2019/0371232 A1* 12/2019 Kim ..................... G09G 3/2014
2020/0051500 A1* 2/2020 Lin ..................... G09G 3/3225
2020/0064701 A1* 2/2020 Nishiyama ..................... G09F 9/30
2020/0159054 A1* 5/2020 Jeong ..................... G02F 1/13336
2020/0327854 A1* 10/2020 Park ..................... G09G 3/3266
2021/0231993 A1* 7/2021 Jeong ..................... G09G 3/32
2022/0093724 A1* 3/2022 Bower ..................... H01L 25/0753
2022/0208952 A1* 6/2022 Shin ..................... H10K 59/131
2023/0100284 A1* 3/2023 Yao ..................... G09G 3/32
345/55
2024/0265855 A1* 8/2024 Lin ..................... G09G 3/32

* cited by examiner

DISPLAY PANEL

CROSS-REFERENCE TO RELATED APPLICATION

This application is a continuation of and claims the priority benefit of U.S. application Ser. No. 17/838,273, filed on Jun. 13, 2022, which claims the priority benefit of Chinese application Ser. No. 20/211,0805686.1, filed on Jul. 16, 2021. The entirety of each of the above-mentioned patent applications is hereby incorporated by reference herein and made a part of this specification.

BACKGROUND

Technical Field

The disclosure relates to a display panel. Particularly, the disclosure relates to a display panel whose overall transmittance can be relatively consistent.

Description of Related Art

Electronic devices or tiled electronic devices have been widely applied in mobile phones, televisions, monitors, tablet computers, automotive displays, wearable devices, and desktop computers. With the vigorous development of electronic devices, quality requirements of the electronic devices are increasingly high.

SUMMARY

The disclosure provides a display panel whose overall transmittance can be relatively consistent.

According to an embodiment of the disclosure, a display panel includes a substrate, a light-emitting unit, a pixel circuit, a scan driver, and an emission driver. The light-emitting unit is arranged on the substrate. The pixel circuit is arranged on the substrate. The pixel circuit includes a data input transistor, a driving transistor, and an emission transistor. The data input transistor is configured to receive a data signal according to a scan signal. The driving transistor is configured to provide a driving current based on the data signal. The emission transistor is configured to transfer the driving current to the light-emitting unit according to an emission signal. The scan driver is arranged on the substrate and is configured to output the scan signal. The emission driver is arranged on the substrate and is configured to output the emission signal. The pixel circuit is arranged between the scan driver and the emission driver.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THIS EMBODIMENTS

Figure 1A:
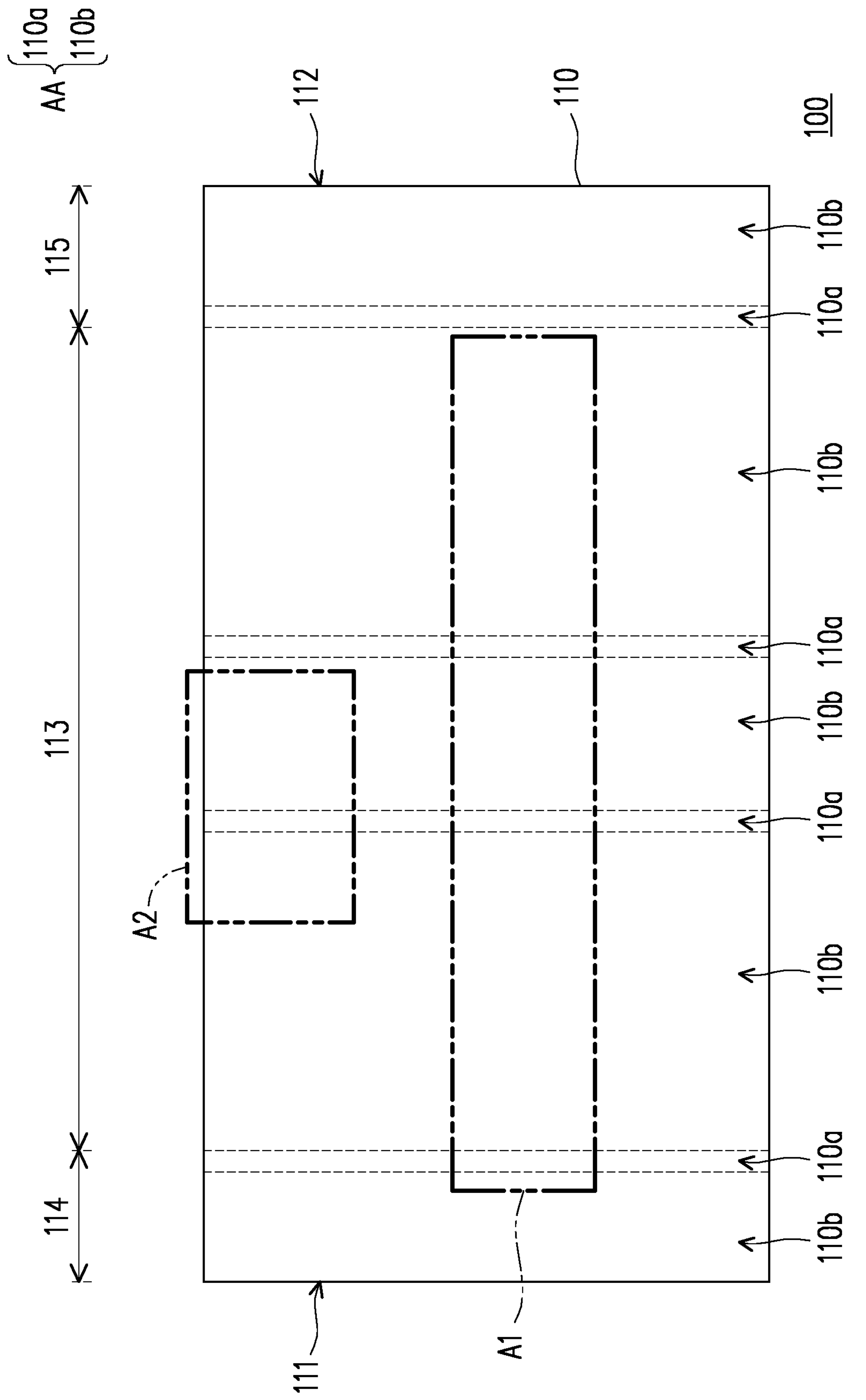
FIG. 1A is a schematic top view of a display panel according to some embodiments of the disclosure.

The disclosure may be understood with reference to the following detailed description together with the accompanying drawings. It should be noted that, for ease of understanding by readers and conciseness of the drawings, a plurality of drawings in the disclosure merely show a part of an electronic device, and specific elements in the drawings are not drawn to scale. In addition, the number and size of the elements in the drawings only serve for exemplifying instead of limiting the scope of the disclosure.

In the following description and claims, terms such as “include”, “comprise”, and “have” are open-ended terms, and thus should be interpreted as “including, but not limited to”.

It should be understood that when an element or film layer is referred to as being arranged “on”, or “connected to” another element or film layer, the element or film layer may be directly on or connected to the another element or film layer, or intervening elements or film layers may also be present in between (non-direct circumstances). In contrast, when an element or film layer is referred to as being “directly on” or “directly connected to” another element or film layer, no intervening elements or film layers are present in between.

Although terms such as “first”, “second”, “third”, etc. may be used to describe diverse constituent elements, such constituent elements are not limited by the terms. The terms are used only to discriminate a constituent element from other constituent elements in the specification. In the claims, the terms first, second, third, etc. may be used in accordance with the order of claiming an element instead of using the same terms. Accordingly, in the following description, a first constituent element may be a second constituent element in the claims.

Herein, the term “about”, “approximately”, “substantially”, or “essentially” typically represents that a value is within 10% of a given value or range, or within 5%, 3%, 2%, 1%, or 0.5% of a given value or range. Herein, the given value is an approximate value, namely implicitly meaning “about,” “approximately”, “substantially”, or “essentially” without specifically describing the terms “about,” “approximately”, “substantially”, or “essentially”. In addition, the terms “a given range is from a first value to a second value” or “a given range falls within a range of a first value to a second value” indicates that the given range includes the first value, the second value, and other values in between.

In some embodiments of the disclosure, terms related to bonding and connection such as “connection”, “interconnection”, etc., unless specifically defined, may indicate the case where two structures are in direct contact, or where two structures are not in direct contact and other structures are arranged in between. Moreover, such terms related to bonding and connection may also cover the case where two structures are both movable or where two structures are both fixed. In addition, the term "couple" includes any direct and indirect electrical connection means.

In the disclosure, the display panel may be applied to an electronic device, for example but not limited to, a display device, antenna device (e.g., liquid crystal antenna), sensing device, light-emitting device, touch device, or tiled device. The electronic device may include a bendable or flexible electronic device. The electronic device may have a shape of rectangle, circle, or polygon, a shape with curved edges, or other suitable shapes. The display device may include a light-emitting diode (LED), liquid crystal, fluorescence, phosphor, quantum dot (QD), other suitable materials, or a combination thereof, for example but not limited thereto. The light-emitting diode may include an organic light-emitting diode (OLED), inorganic light-emitting diode, mini light-emitting diode (mini LED), micro light-emitting diode (micro LED), or quantum dot light-emitting diode (QDLED), other suitable materials, or a combination thereof, for example but not limited thereto. The display device may also include a tiled display device, for example but not limited thereto. The antenna device may be a liquid crystal antenna, for example but not limited thereto. The antenna device may include a tiled antenna device, for example but not limited thereto. It should be noted that the electronic device may be any arrangement or combination of the above, but is not limited thereto. The electronic device may have peripheral systems such as a driving system, control system, light source system, shelving system, and the like to support the display device, antenna device, or tiled device. Hereinafter, a display panel will be adopted to describe the content of the disclosure, but the disclosure is not limited thereto.

It should be understood that the features in several different embodiments below may be replaced, recombined, mixed with each other to achieve other embodiments without departing from the spirit of the disclosure. The features in the embodiments may be arbitrarily used in mixture or combination without departing from the spirit of the disclosure or conflicting with each other.

Reference will now be made in detail to the exemplary embodiments of the disclosure, examples of which are illustrated in the accompanying drawings. Wherever possible, the same reference numerals are used in the drawings and description to denote the same or like parts.

Figure 1B:
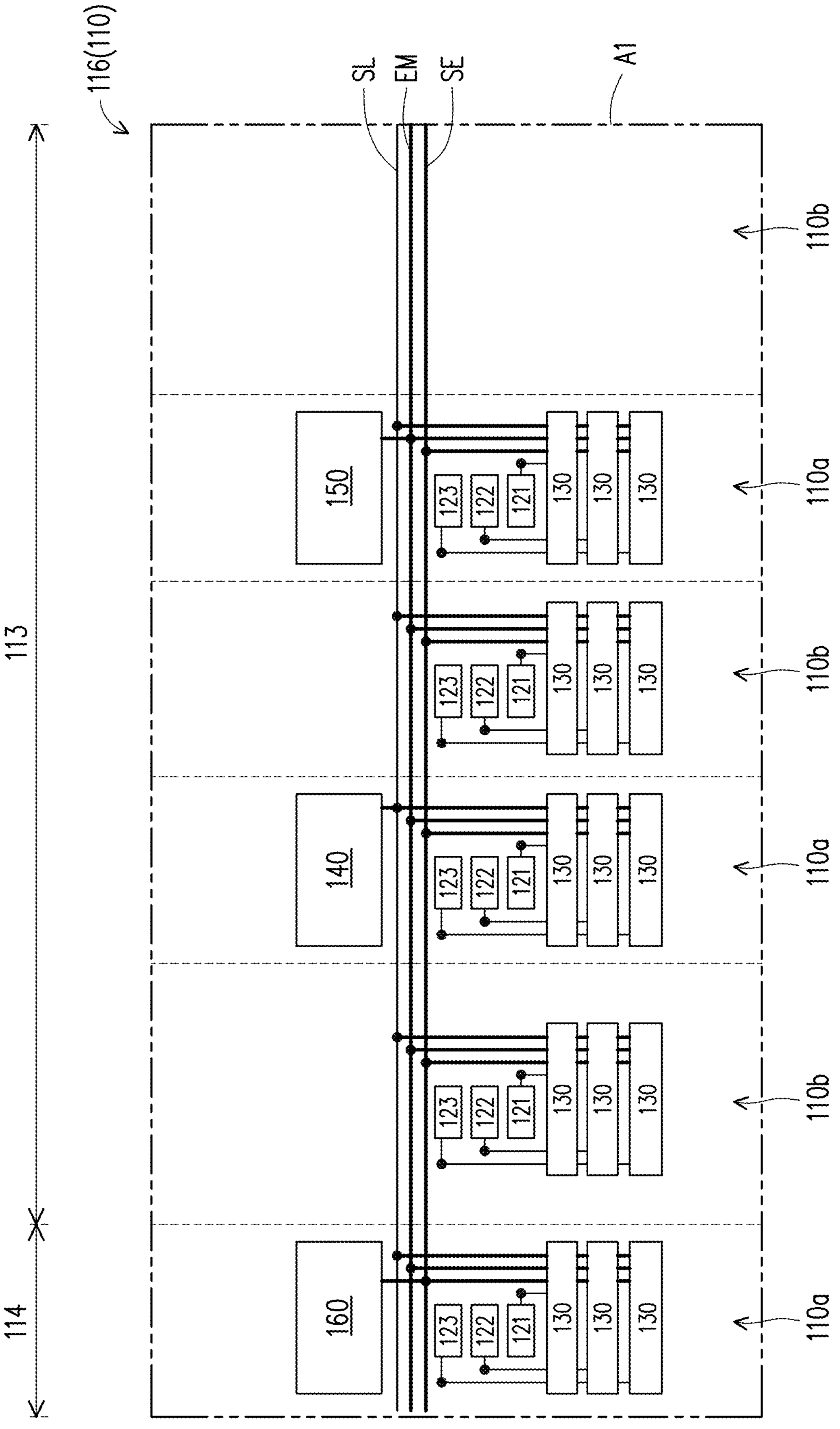
FIG. 1B is an enlarged view of region A1 of FIG. 1A.
Figure 1C:
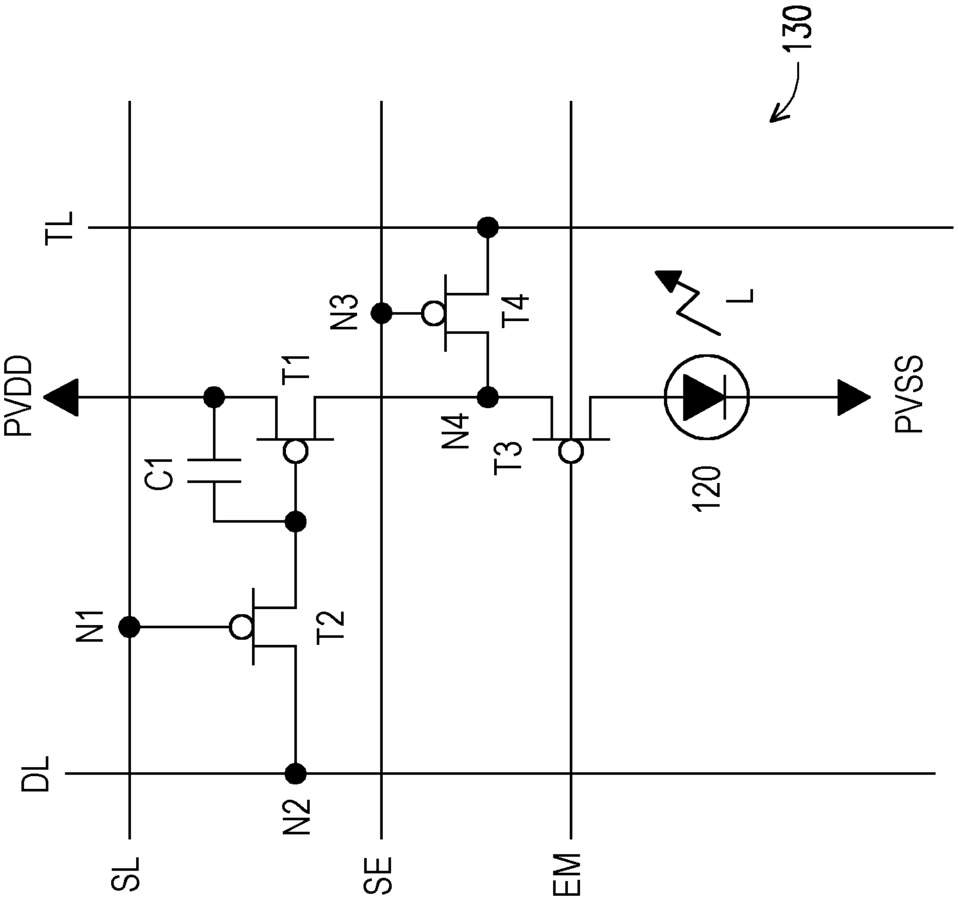
FIG. 1C is a schematic circuit view of a pixel circuit of FIG. 1B.
Figure 1D:
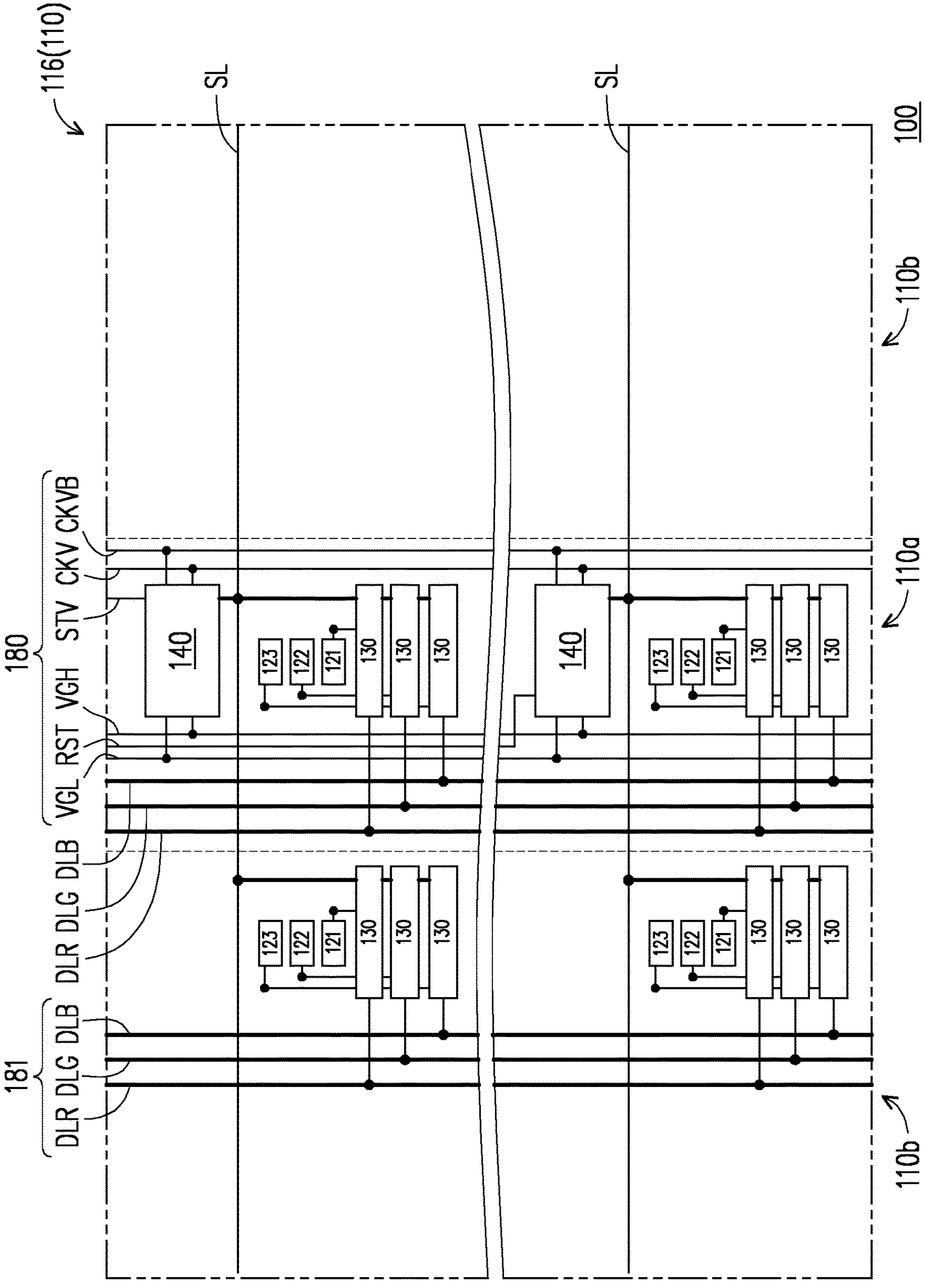
FIG. 1D is an enlarged view of region A2 of FIG. 1A.
Figure 1E:
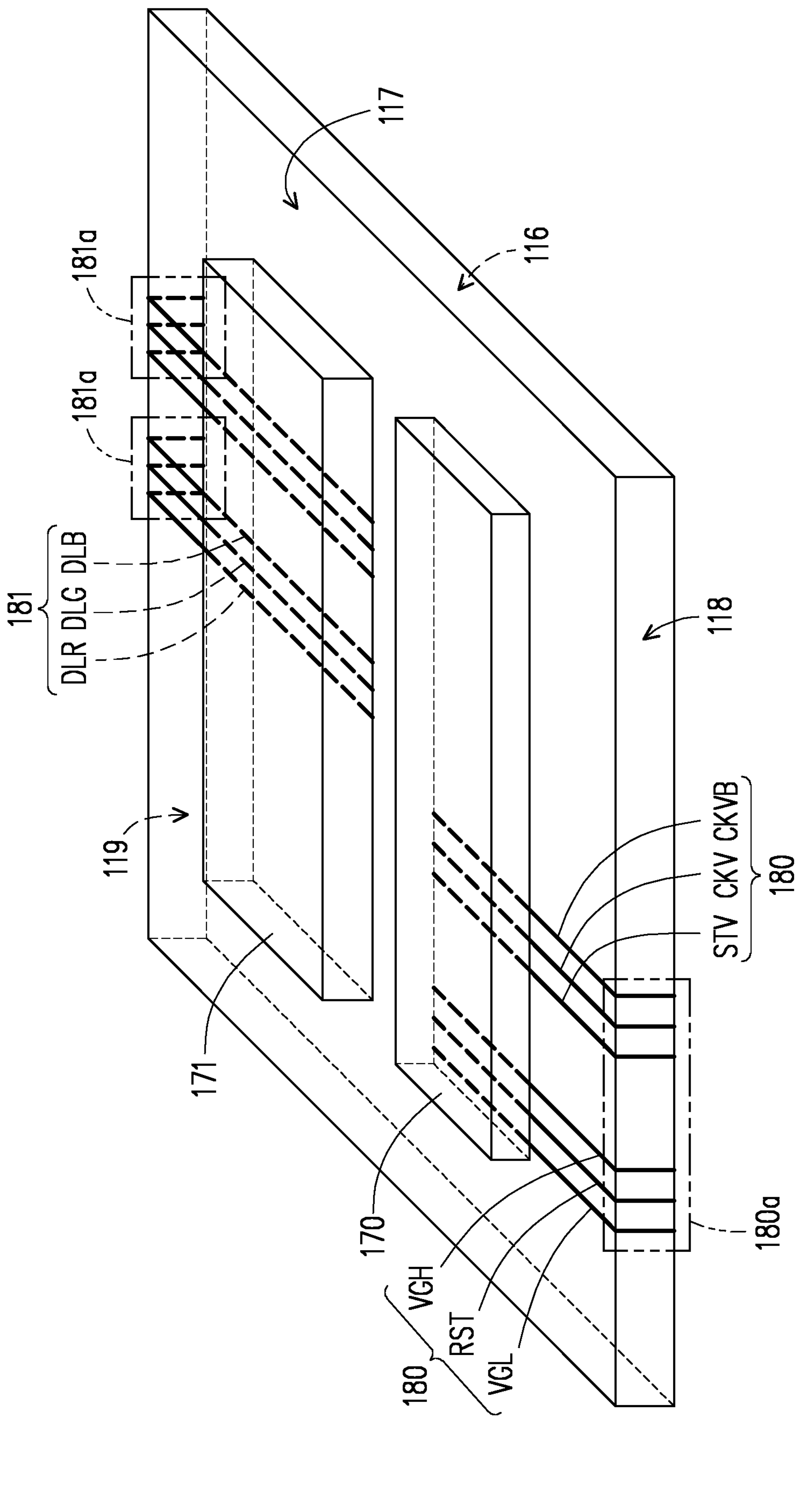
FIG. 1E is a schematic perspective bottom view of the display panel of FIG. 1A.

FIG. 1A is a schematic top view of a display panel according to some embodiments of the disclosure. FIG. 1B is an enlarged view of region A1 of FIG. 1A. FIG. 1C is a schematic circuit view of a pixel circuit of FIG. 1B. FIG. 1D is an enlarged view of region A2 of FIG. 1A. FIG. 1E is a schematic perspective bottom view of the display panel of FIG. 1A. In FIG. 1A and FIG. 1E omit illustration of some elements in a display panel 100 for clarity of the drawings and convenience of description.

With reference to FIG. 1A and FIG. 1B, the display panel 100 of this embodiment includes a substrate 110, a light-emitting unit 120, a pixel circuit 130, a scan driver 140, and an emission driver 150. The substrate 110 includes an active region AA, and the active region AA includes a gate driver arrangement region 110*a* and a non-gate driver arrangement region 110*b* that are spaced apart. In this embodiment, the substrate 110 has a first side 111 and a second side 112 opposite to each other, a central region 113, side regions 114, 115, and a first surface 116 and a second surface 117 opposite each other (as shown in FIG. 1E). The side region 114 and the side region 115 are respectively arranged on opposite sides of the central region 113. The side region 114 is adjacent to the first side 111, the side region 115 is adjacent to the second side 112, and the central region 113 is away from the first side 111 and the second side 112. In addition, in this embodiment, the substrate 110 may comprise a rigid substrate, a soft substrate, or a combination thereof. For example, the material of the substrate 110 may include, but is not limited to, glass, quartz, sapphire, ceramic, polycarbonate (PC), polyimide (PI), polyethylene terephthalate (PET), other suitable substrate materials, or a combination thereof.

In this embodiment, the light-emitting unit 120 is arranged on the first surface 116 of the substrate 110. The light-emitting unit 120 is arranged in the gate driver arrangement region 110*a* and the non-gate driver arrangement region 110*b* in the active region AA. In this embodiment, the light-emitting unit 120 may include light-emitting diodes of different colors, for example but not limited to, a red light-emitting diode 121, a green light-emitting diode 122, and a blue light-emitting diode 123.

In this embodiment, the pixel circuit 130 is arranged on the first surface 116 of the substrate 110. The pixel circuit 130 is arranged between the scan driver 140 and the emission driver 150. The pixel circuit 130 is arranged in the gate driver arrangement region 110*a* and the non-gate driver arrangement region 110*b* in the active region AA. The red light-emitting diode 121, the green light-emitting diode 122, and the blue light-emitting diode 123 may respectively be electrically connected to the corresponding pixel circuits 130. Therefore, the light-emitting diodes of different colors, i.e., the red light-emitting diode 121, the green light-emitting diode 122, and the blue light-emitting diode 123, may be driven by the pixel circuit 130.

Specifically, with reference to FIG. 1C, the pixel circuit 130 includes a driving transistor T1, a data input transistor T2, an emission transistor T3, a scan line SL, a data line DL, an emission signal line EM, a capacitor C1, a high power voltage PVDD, a low power voltage PVSS, and nodes N1, N2. A scan signal of the scan line SL may be input to the data input transistor T2 through the node N1 to turn on the data input transistor T2. When the data input transistor T2 is turned on, a data signal of the data line DL is input to the data input transistor T2 through the node N2. Next, the data signal is transferred through the data input transistor T2 to the driving transistor T1 to turn on the driving transistor T1. When the driving transistor T1 is turned on, a driving current of the high power voltage PVDD is input to the driving transistor T1 and transferred through the driving transistor T1 to the emission transistor T3. Then, when an emission signal of the emission signal line EM is input to the emission transistor T3 to turn on the emission transistor T3, the emission transistor T3 transfers the driving current to the light-emitting unit 120 to drive the light-emitting unit 120 to emit light L. In other words, the data input transistor T2 may be configured to receive the data signal from the data line DL according to the scan signal, and to transfer the data signal to the driving transistor T1. The driving transistor T1 may be configured to provide the driving current from the high power voltage PVDD to the emission transistor T3 based on the data signal. The emission transistor T3 may be configured to transfer the driving current to the light-emitting unit 120 according to the emission signal from the emission signal line EM.

Next, with reference to FIG. 1B, in this embodiment, the scan driver 140 is arranged on the first surface 116 of the substrate 110, and is arranged in the central region 113 of the substrate 110. The scan driver 140 is arranged in the gate driver arrangement region 110*a* away from the first side 111 and the second side 112 in the active region AA. The scan driver 140 may be electrically connected to the pixel circuit 130. To be specific, the scan driver 140 may be configured to output the scan signal to the scan line SL to transfer the scan signal to the data input transistor T2 in the pixel circuit 130 through the scan line SL. In addition, since the scan driver 140 is arranged in the central region 113 of the substrate 110, the transmission path of the scan signal transferred to the pixel circuit 130 adjacent to the first side 111 is substantially similar to the transmission path of the scan signal transferred to the pixel circuit 130 adjacent to the second side 112 (i.e., the transmission paths of the scan signal of the scan driver 140 transferred to both sides of the substrate 110 are similar), accordingly reducing the distortion of the scan signal.

In this embodiment, the emission driver 150 is arranged on the first surface 116 of the substrate 110, and is arranged in the central region 113 of the substrate 110. The emission driver 150 is arranged in the gate driver arrangement region 110*a* away from the first side 111 and the second side 112 in the active region AA. The emission driver 150 may be electrically connected to the pixel circuit 130. To be specific, the emission driver 150 may be configured to output the emission signal to the emission signal line EM to transfer the emission signal to the emission transistor T3 in the pixel circuit 130 through the emission signal line EM. In addition, since the emission driver 150 is arranged in the central region 113 of the substrate 110, the transmission path of the emission signal transferred to the pixel circuit 130 adjacent to the first side 111 is substantially similar to the transmission path of the emission signal transferred to the pixel circuit 130 adjacent to the second side 112 (i.e., the transmission paths of the emission signal of the emission driver 150 transferred to both sides of the substrate 110 are similar), accordingly reducing the distortion of the emission signal. In some embodiments, a signal transfer path of at least one of the scan driver 140 and the emission driver 150 is transferring from the central region 113 to the first side 111 and the second side 112 of the substrate 110, accordingly reducing the distortion of the signal(s).

Next, with reference to FIG. 1B and FIG. 1C, in this embodiment, the display panel 100 further includes a sensing driver 160, and the pixel circuit 130 further includes a sensing transistor T4, a sensing signal line SE, a test signal line TL, and nodes N3, N4, but not limited thereto. Specifically, the sensing driver 160 is arranged on the first surface 116 of the substrate 110 and arranged in the side region 114 of the substrate 110. In some embodiments, the sensing driver 160 may also be arranged in the side region 115 (not shown) of the substrate 110. The sensing driver 160 is arranged in the gate driver arrangement region 110*a* adjacent to the first side 111 or to the second side 112 in the active region AA. The sensing driver 160 may be electrically connected to the pixel circuit 130. To be specific, the sensing driver 160 may be configured to output a sensing signal to the sensing signal line SE to transfer the sensing signal to the sensing transistor T4 in the pixel circuit 130 through the sensing signal line SE. When the sensing signal is transferred through the node N3 to the sensing transistor T4 and the sensing transistor T4 is turned on, the driving current is input to the sensing transistor T4 through the node N4, and is transferred through the sensing transistor T4 to the test signal line TL. In other words, the sensing transistor T4 may be configured to sense the driving current from the driving transistor T1 according to the sensing signal.

In addition, since consideration of the distortion of the sensing signal is relatively unnecessary, the sensing driver 160 may be arranged in the side region 114 of the substrate 110. In other words, even if the transmission path of the sensing signal transferred to the pixel circuit 130 adjacent to the second side 112 is obviously greater than the transmission path of the sensing signal transferred to the pixel circuit 130 adjacent to the first side 111, consideration of the distortion is still relatively unnecessary. Therefore, in this embodiment, the scan driver 140 is closer to the central region 113 of the substrate 110 than the sensing driver 160 is, and the emission driver 150 is closer to the central region 113 of the substrate 110 than the sensing driver 160 is. In some embodiments, the scan driver 140 and the emission driver 150 are arranged in the central region 113 of the substrate 110, and the arrangement and quantity of the scan driver 140 and the emission driver 150 are not limited, and may be flexibly designed depending on design requirements. In some embodiments, the test signal line TL may test whether problems (e.g., short circuits and open circuits) exist in the pixel circuit 130 to facilitate repair or compensation.

In this embodiment, by arranging the scan driver 140, the emission driver 150, and the sensing driver 160 in the active region AA (i.e., the display region) of the substrate 110, the peripheral region (i.e., the non-display region or border) of the substrate 110 can be reduced to the minimum, maximizing the overall display region of the display panel 100. In some embodiments, it may even be possible that arranging an additional peripheral region is unnecessary, and the entire display panel 100 can display images.

In this embodiment, although FIG. 1A schematically shows four gate driver arrangement regions 110*a* and five non-gate driver arrangement regions 110*b*, the number of gate driver arrangement regions 110*a* and the number of non-gate driver arrangement regions 110*b* are not limited by the disclosure. In other words, in some embodiments, three, four, or more gate driver arrangement regions 110*a* may be arranged depending on requirements, and four, five, or more non-gate driver arrangement regions 110*b* may also be arranged depending on requirements, as long as the scan driver 140, the emission driver 150, and the sensing driver 160 are all arranged in the active region AA of the substrate 110. In some embodiments, the number of scan drivers 140, the number of emission drivers 150, and the number of sensing drivers 160 are not limited, and may be flexibly designed depending on design requirements.

In this embodiment, although FIG. 1B schematically shows one scan driver 140, one emission driver 150, or one sensing driver 160 in the gate driver arrangement regions 110*a* at different positions, the number of gate driver arrangement regions 110*a*, the number of scan drivers 140, the number of emission drivers 150, and the number of sensing drivers 160 are not limited by the disclosure. In other words, in some embodiments, a plurality of scan drivers 140, a plurality of emission drivers 150, and a plurality of sensing drivers 160 may be arranged in the gate driver arrangement region 110*a* depending on requirements, as long as the plurality of scan drivers 140 and the plurality of emission drivers 150 are dispersed in the central region 113 of the substrate 110, and the plurality of sensing drivers 160 are dispersed in the side region 114 (or the side region 115) of the substrate 110.

Then, with reference to FIG. 1D and FIG. 1E, in this embodiment, the display panel 100 further includes a circuit board 170, a circuit board 171, a first signal line 180, and a second signal line 181. The substrate 110 further has a first side surface 118 and a second side surface 119 opposite to each other. The first side surface 118 (or the second side surface 119) may be connected to the first surface 116 and the second surface 117, and the first side surface 118 (or the second side surface 119) may also be connected to the first side 111 and the second side 112. Specifically, the circuit board 170 and the circuit board 171 are each arranged on the second surface 117 of the substrate 110.

The first signal line 180 is arranged on the second surface 117 of the substrate 110 and extends to the first surface 116 along the first side surface 118. The second signal line 181 is arranged on the second surface 117 of the substrate 110 and extends to the first surface 116 along the second side surface 119. In other words, a part 180*a* of the first signal line 180 and a part 181*a* of the second signal line 181 may be respectively arranged on two opposite side surfaces (i.e., the first side surface 118 and the second side surface 119) of the substrate 110. In this embodiment, the first signal line 180 includes a low-level gate voltage VGL, a reset signal RST, a high-level gate voltage VGH, a start signal STV, a vertical clock CKV, or a vertical clock CKVB, but not limited thereto. The second signal line 181 includes a data line DLR configured for the red light-emitting diode 121, a data line DLG configured for the green light-emitting diode 122, or a data line DLB configured for the blue light-emitting diode 123, but not limited thereto. In some embodiments, the first signal line 180 located on the first surface 116 is arranged in the gate driver arrangement region 110*a*, and the second signal line 181 located on the first surface 116 is arranged in the gate driver arrangement region 110*a* and the non-gate driver arrangement region 110*b*, but not limited thereto.

In this embodiment, the circuit board 170 located on the second surface 117 may be electrically connected to the scan driver 140 located on the first surface 116 through the first signal line 180, and the circuit board 171 on the second surface 117 may be electrically connected to the data input transistor T2 in the pixel circuit 130 located on the first surface 116 through the second signal line 181, as shown in FIG. 1D and FIG. 1E. The first signal line 180 is not overlapped with the second signal line 181 in the normal direction of the substrate 110, but not limited thereto.

In addition, in this embodiment, the materials of the first signal line 180 and the second signal line 181 may include molybdenum, titanium, tantalum, niobium, hafnium, nickel, chromium, cobalt, zirconium, tungsten, aluminum, copper, silver, other suitable metals, or an alloy or a combination of the above materials, but not limited thereto. In some embodiments, it may be designed that one of the circuit board 170 and the circuit board 171 located on the second surface 117 may be electrically connected to the pixel circuit 130 located on the first surface 116 by the first signal line 180 and/or the second signal line 181 through the first side surface 118 and/or the second side surface 119, but not limited thereto.

Other embodiments will be provided below for description. It should be noted here that the reference numerals and part of contents of the embodiments above remain to be used in the following embodiments, where the same reference numerals are used to denote the same or like elements, and the description of the same technical content is omitted. Reference may be made to the embodiments above for the description of the omitted parts, which will not be repeated in the following embodiments.

Figure 2:
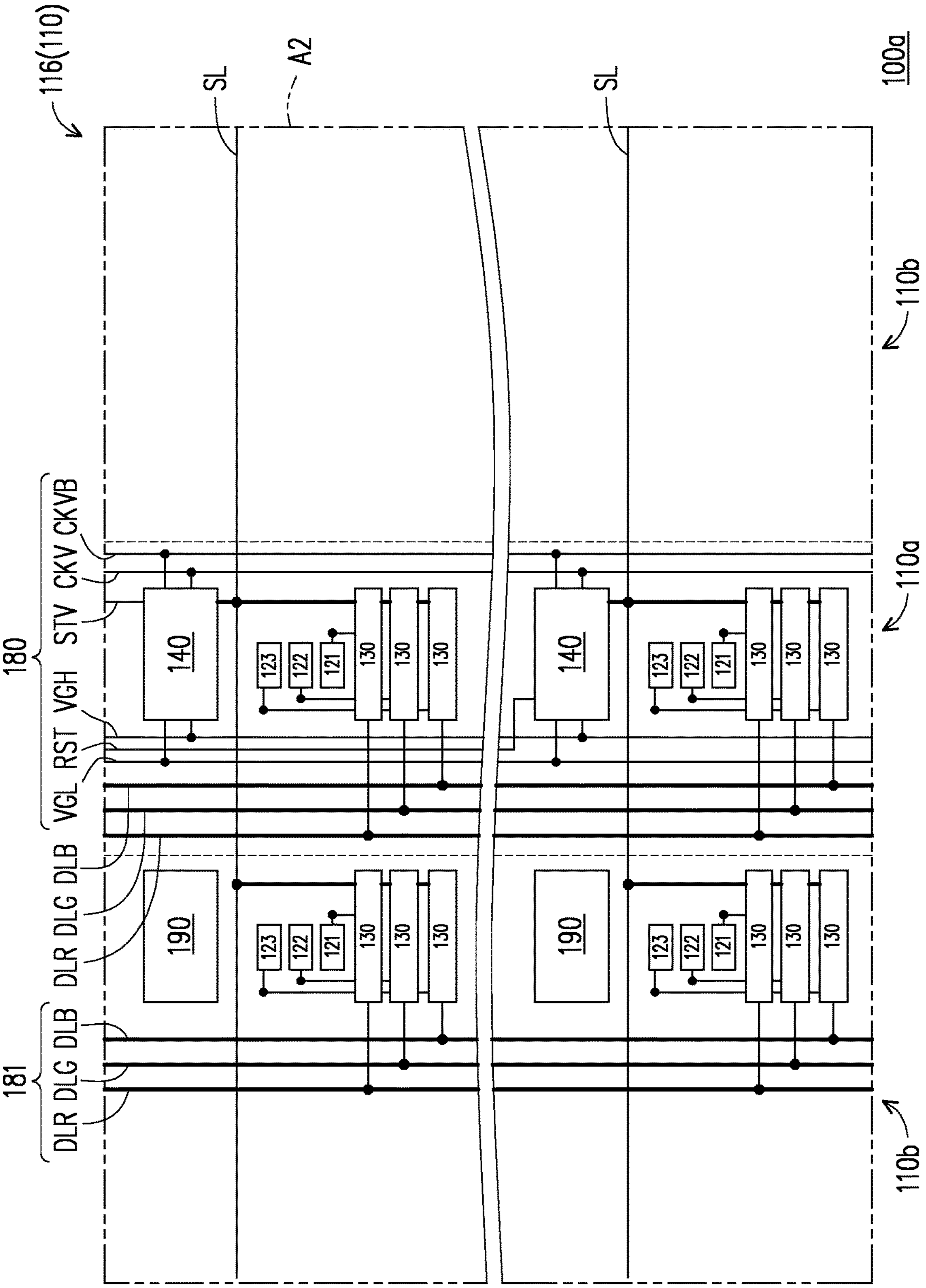
FIG. 2 is a schematic partial top view of a display panel according to some embodiments of the disclosure.

FIG. 2 is a schematic partial top view of a display panel according to some embodiments of the disclosure. With reference to FIG. 1D and FIG. 2 at the same time, a display panel 100*a* of this embodiment is substantially similar to the display panel 100 of FIG. 1D, so the same and like members in the two embodiments will not be repeatedly described here. One of the differences between the display panel 100*a* of this embodiment and the display panel 100 is that the display panel 100*a* of this embodiment further includes an opaque pattern 190.

Specifically, with reference to FIG. 2, in this embodiment, the opaque pattern 190 is arranged on the first surface 116 of the substrate 110, and is arranged in the central region 113 and the side regions 114, 115 (not shown) of the substrate 110, but not limited thereto. The opaque pattern 190 is arranged in the non-gate driver arrangement region 110*b* in the active region AA. The opaque pattern 190 is insulated from the pixel circuit 130, and may be regarded as a dummy pattern. The material of the opaque pattern 190 includes metal, black matrix (BM), other suitable light-shielding materials, or a combination thereof, but not limited thereto.

In this embodiment, since an area of the opaque pattern 190 is substantially equal to an area of the scan driver 140, an area of the emission driver 150, or an area of the sensing driver 160, a transmittance of the non-gate driver arrangement region 110*b* where the opaque pattern 190 is arranged is substantially equal to a transmittance of the gate driver arrangement region 110*a* where the scan driver 140, the emission driver 150, or the sensing driver 160 is arranged. In other words, in the display panel 100*a* where the scan driver 140, the emission driver 150, and/or the sensing driver 160 are arranged in the active region AA, the overall transmittance of the display panel 100*a* can be relatively consistent by arranging the opaque pattern 190. In this embodiment, the transmittance of the gate driver arrangement region 110*a* and the transmittance of the non-gate driver arrangement region 110*b* are about 40% to 70%.

Figure 3A:
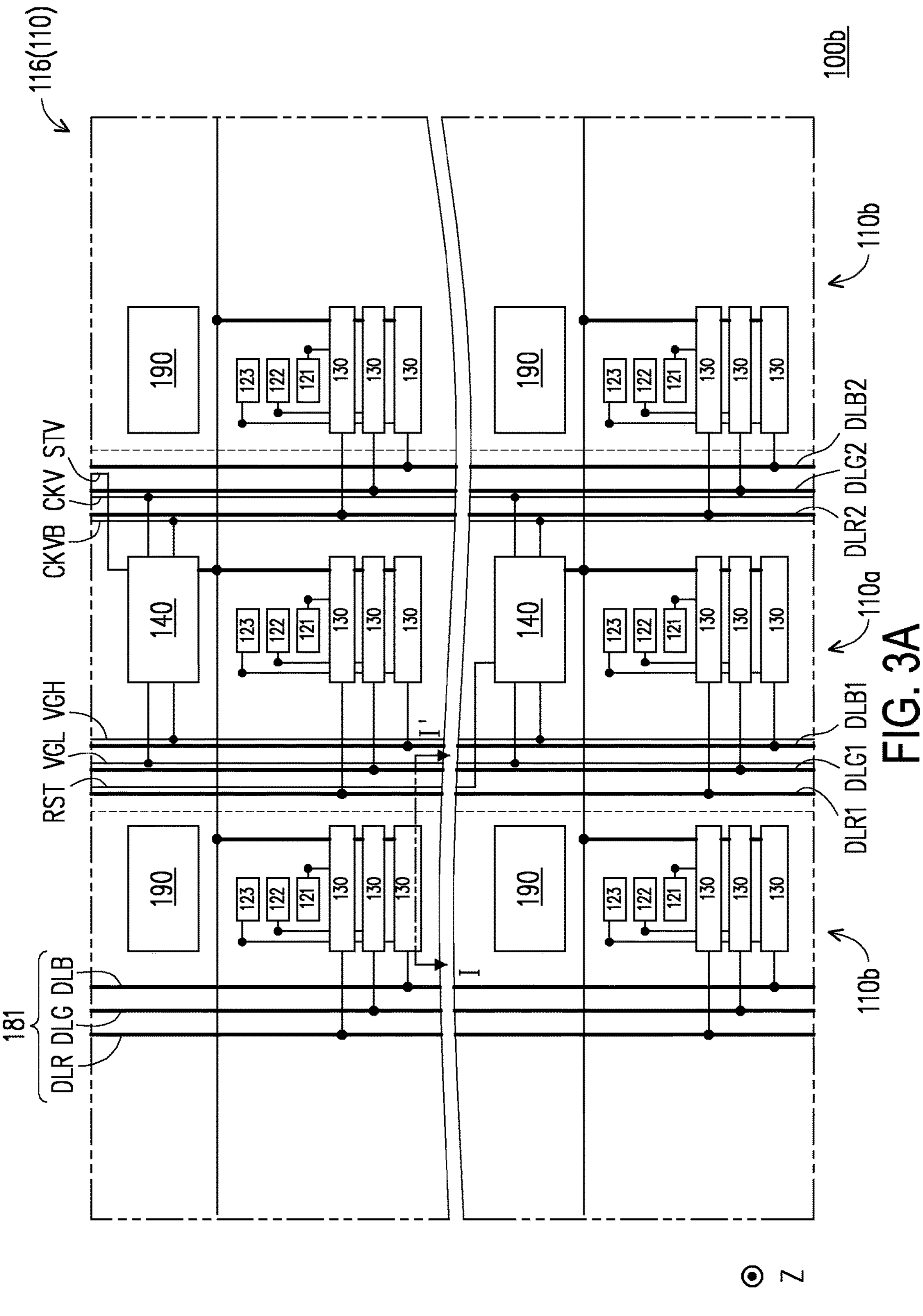
FIG. 3A is a schematic partial top view of a display panel according to some embodiments of the disclosure.
Figure 3B:
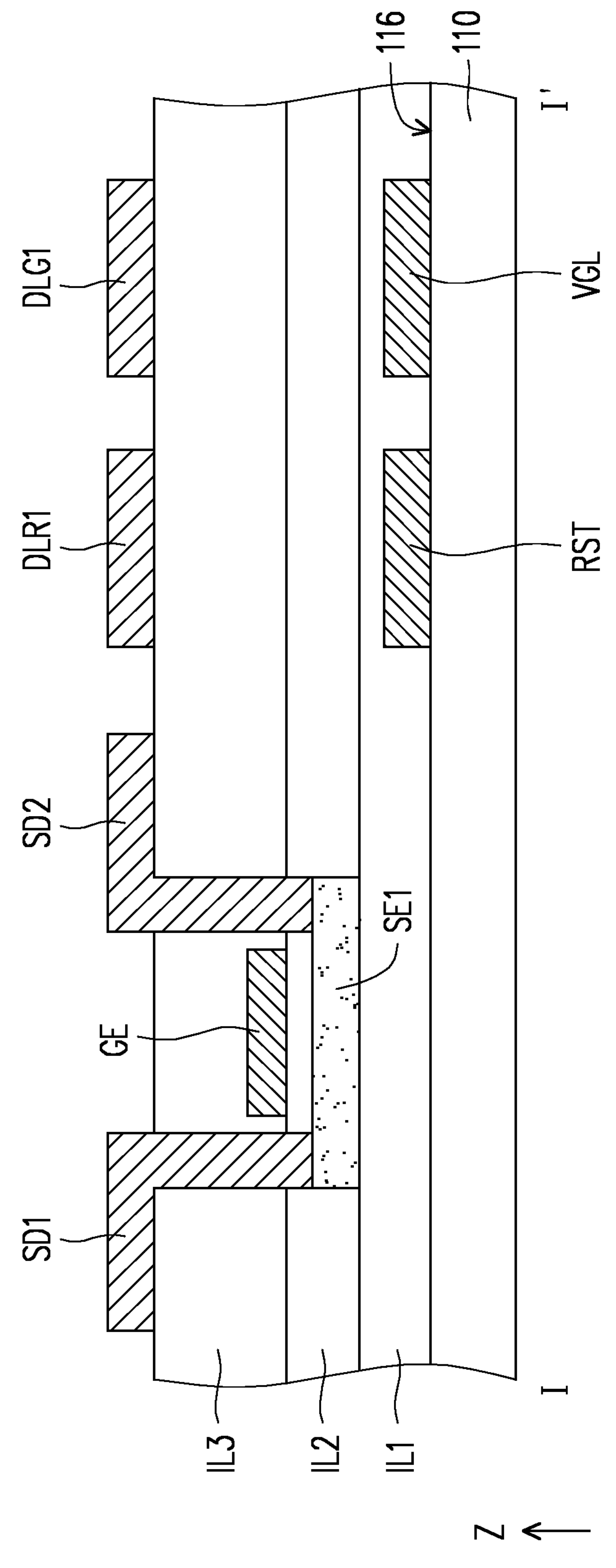
FIG. 3B is a schematic cross-sectional view of the display panel of FIG. 3A along section line I-I'.

FIG. 3A is a schematic partial top view of a display panel according to some embodiments of the disclosure. FIG. 3B is a schematic cross-sectional view of the display panel of FIG. 3A along section line I-I'. With reference to FIG. 2 and FIG. 3A at the same time, a display panel 100*b* of this embodiment is substantially similar to the display panel 100*a* of FIG. 2, so the same and like members in the two embodiments will not be repeatedly described here. One of the differences between the display panel 100*b* of this embodiment and the display panel 100*a* is that, in the display panel 100*b* of this embodiment, the first signal line 180 and the second signal line 181 are overlapped.

Specifically, with reference to FIG. 3A, in this embodiment, the first signal line 180 located on the first surface 116 is arranged in the gate driver arrangement region 110*a*, and the second signal line 181 located on the first surface 116 is arranged in the gate driver arrangement region 110*a* and the non-gate driver arrangement region 110*b*. The first signal line 180 includes the low-level gate voltage VGL, the reset signal RST, the high-level gate voltage VGH, the start signal STV, the vertical clock CKV, or the vertical clock CKVB, but not limited thereto. The second signal line 181 includes data lines DLR, DLR1, DLR2 configured for the red light-emitting diode 121, data lines DLG, DLG1, DLG2 for the green light-emitting diode 122, or data lines DLB, DLB1, DLB2 for the blue light-emitting diode 123, but not limited thereto. The data line DLR, the data line DLG, and the data line DLB are arranged in the non-gate driver arrangement region 110*b*, and the data lines DLR1, DLR2, the data lines DLG1, DLG2, and the data lines DLB1, DLB2 are arranged in the gate driver arrangement region 110*a*.

With reference to FIG. 3A and FIG. 3B together, in this embodiment, in the normal direction Z of the substrate 110, the data line DLR1 is overlapped with part of the reset signal RST, the data line DLG1 is overlapped with the low-level gate voltage VGL, the data line DLB1 is overlapped with the high-level gate voltage VGH, the data line DLR2 is overlapped with the vertical clock CKVB, the data line DLG2 is overlapped with the vertical clock CKV, and the data line DLB2 is overlapped with part of the start signal STV. In other words, at least part of the first signal line 180 is overlapped with the second signal line 181.

More specifically, with reference to FIG. 3B, the reset signal RST and the low-level gate voltage VGL are arranged on the first surface 116 of the substrate 110. An insulating layer IL1 is arranged on the first surface 116 of the substrate 110 and covers the reset signal RST and the low-level gate voltage VGL. A semiconductor layer SE1 of the driving transistor T1 is arranged on the insulating layer IL1. An insulating layer IL2 is arranged on the insulating layer IL1 and covers the semiconductor layer SE1. A gate GE of the driving transistor T1 is arranged on the insulating layer IL2. An insulating layer IL3 is arranged on the insulating layer IL2 and covers the gate GE. A source SD1 and a drain SD2 of the driving transistor T1 are arranged on the insulating layer IL3 and are electrically connected to the semiconductor layer SE1. The data line DLR1 and the data line DLG1 are both arranged on the insulating layer IL3. The data line DLR1 is arranged corresponding to the reset signal RST, and the data line DLG1 is arranged corresponding to the low-level gate voltage VGL.

In this embodiment, by arranging the opaque pattern 190 and overlapping the first signal line 180 and the second signal line 181, the transmittance of the non-gate driver arrangement region 110*b* where the opaque pattern 190 is arranged can be substantially further equal to the transmittance of the gate driver arrangement region 110*a* where the scan driver 140, the emission driver 150, or the sensing driver 160 is arranged. In other words, in the display panel 100*b* where the scan driver 140, the emission driver 150, and/or the sensing driver 160 are arranged in the active region AA, the overall transmittance of the display panel 100*b* can be more consistent by arranging the opaque pattern 190 and overlapping the first signal line 180 and the second signal line 181.

In addition, in this embodiment, the signal of the first signal line 180 may come from the circuit board 170, and the signal of the second signal line 181 may come from the circuit board 171, as shown in FIG. 1E. To be specific, since the first signal line 180 and the second signal line 181 located on the first surface 116 may respectively extend from the first side surface 118 and the second side surface 119 of the substrate 110 to the second surface 117 of the substrate 110, and may respectively be electrically connected to the circuit board 170 and the circuit board 171, the signal sent by the circuit board 170 may be transferred through the first signal line 180 on the first side surface 118 to the first signal line 180 located on the first surface 116, and the signal sent by the circuit board 171 may be transferred through the second signal line 181 on the second side surface 119 to the second signal line 181 located on the first surface 116, but not limited thereto. In other words, in some embodiments, the signal source of the first signal line 180 and the signal source of the second signal line 181 may also employ other ways of transfer, but not limited thereto.

Figure 4:
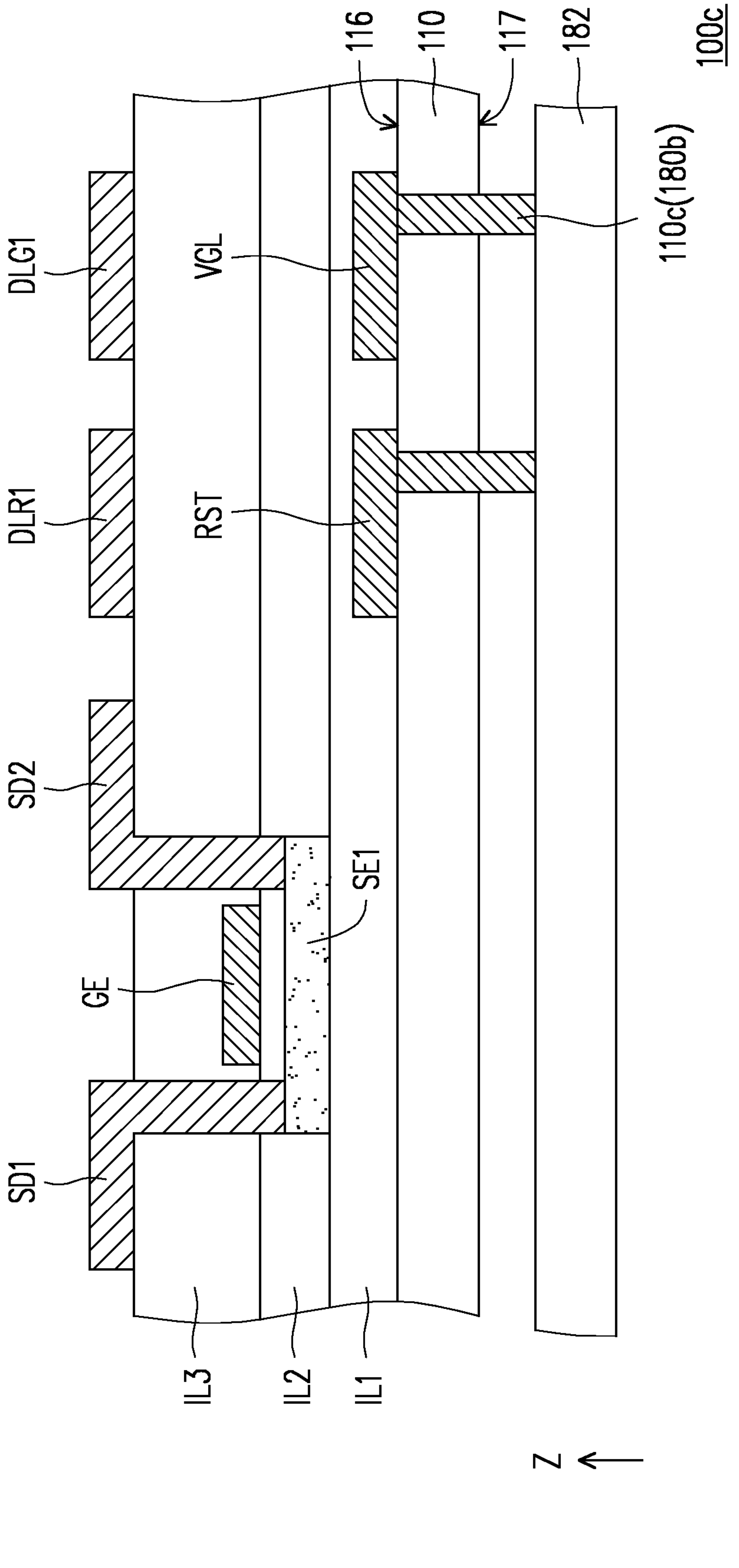
FIG. 4 is a schematic partial cross-sectional view of a display panel according to some embodiments of the disclosure.

FIG. 4 is a schematic partial cross-sectional view of a display panel according to some embodiments of the disclosure. With reference to FIG. 3B and FIG. 4 at the same time, a display panel 100*c* of this embodiment is substantially similar to the display panel 100*b* of FIG. 3B, so the same and like members in the two embodiments will not be repeatedly described here. One of the differences between the display panel 100*c* of this embodiment and the display panel 100*b* is that, in the display panel 100*c* of this embodiment, the substrate 110 further includes a conductive through hole 110*c*.

Specifically, with reference to FIG. 4, in the display panel 100*c* of this embodiment, the circuit board 170 and the circuit board 171 of FIG. 1E are replaced with a circuit board 182. The circuit board 182 is arranged on the second surface 117 of the substrate 110. The circuit board 182 is not in contact with the substrate 110, and the circuit board 182 is spaced apart by a distance from the substrate 110. In this embodiment, the conductive through hole 110*c* penetrates the substrate 110 to electrically connect the first signal line 180 (the reset signal RST and the low-level gate voltage VGL schematically taken as an example in FIG. 4) arranged on the first surface 116 to the circuit board 182 respectively through the corresponding conductive through hole 110*c*. Therefore, the conductive through hole 110*c* may here be regarded as a part 180*b* of the first signal line 180. In other words, since the part 180*b* of the first signal line 180 may penetrate the substrate 110, and the first signal line 180 located on the first surface 116 may be electrically connected to the circuit board 182 through the part 180*b*, the signal sent by the circuit board 182 may be transferred through the part 180*b* of the first signal line 180 penetrating the substrate 110 to the first signal line 180 on the first surface 116.

Similarly, in this embodiment, a part (not shown) of the second signal line 181 may also penetrate the substrate 110 and be electrically connected to the circuit board 182 to thus transfer the signal sent by the circuit board 182 through the part of the second signal line 181 penetrating the substrate 110 to the second signal line 181 on the first surface 116. In some embodiments, the circuit board 182 may be in contact with the substrate 110 through an adhesive layer (not shown), but not limited thereto. In some embodiments, the circuit board 182 includes a chip (not shown), a circuit wire (not shown), or the like, but not limited thereto.

Figure 5A:
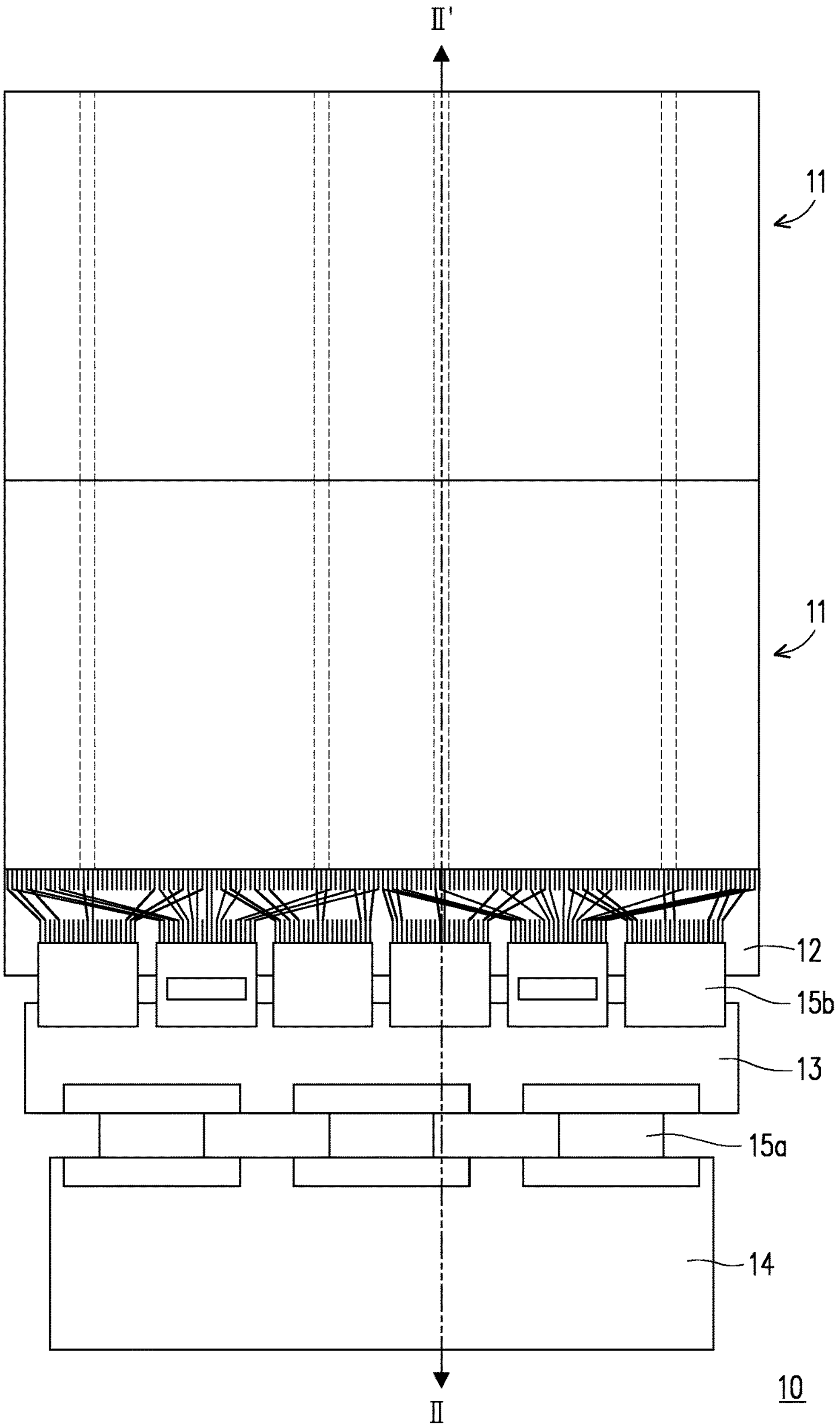
FIG. 5A is a schematic top view of a tiled display device according to some embodiments of the disclosure.
Figure 5B:
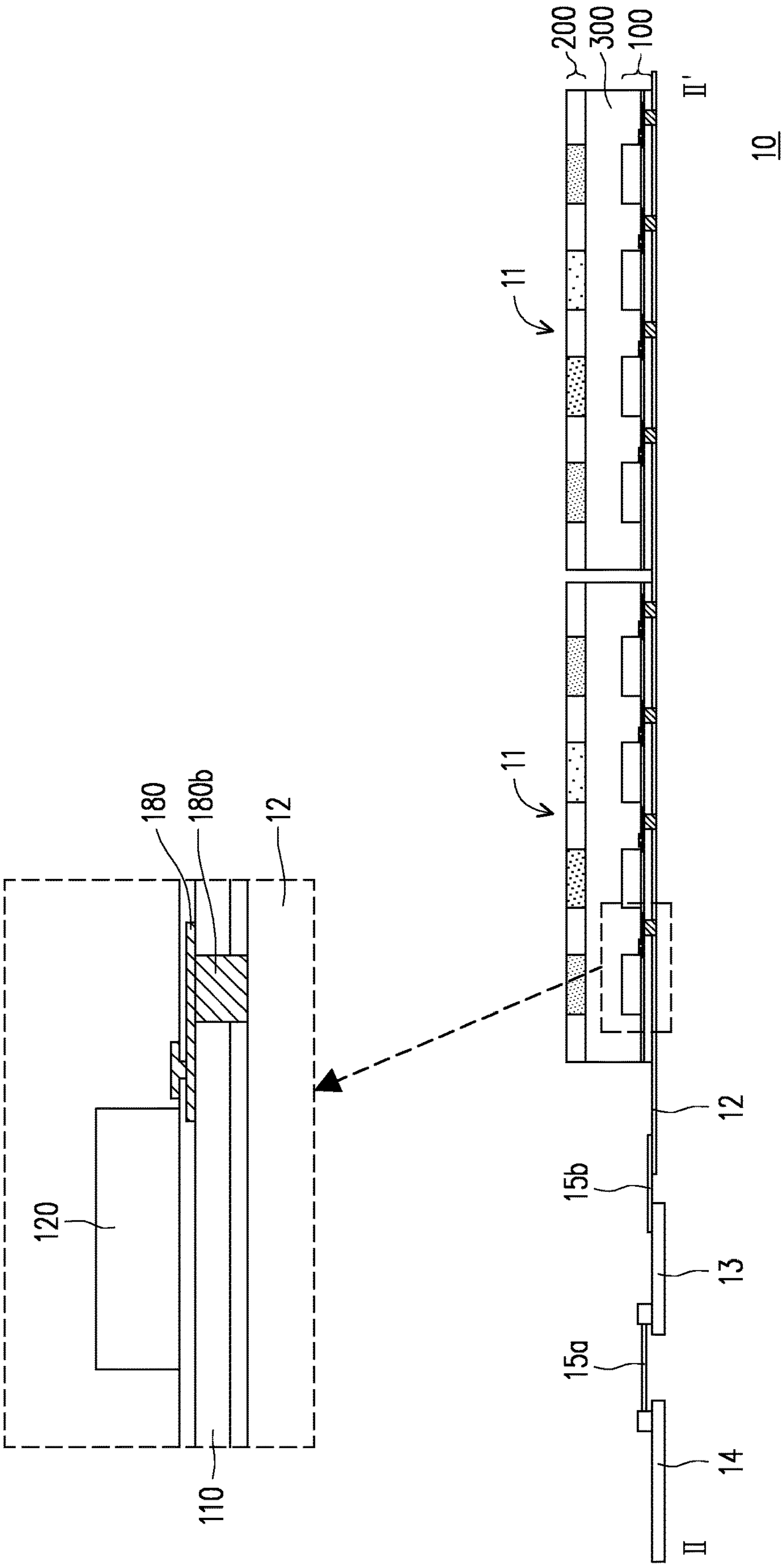
FIG. 5B is a schematic cross-sectional view of the tiled display device of FIG. 5A along section line II-II'.

FIG. 5A is a schematic top view of a tiled display device according to some embodiments of the disclosure. FIG. 5B is a schematic cross-sectional view of the tiled display device of FIG. 5A along section line II-II'. FIG. 5A omits illustration of a light conversion plate 200, a filling layer 300, and some elements in the display panel 100 for clarity of the drawings and convenience of description.

With reference to FIG. 5A and FIG. 5B, the tiled display device 10 of this embodiment includes a plurality of tiled units 11 (two tiled units 11 schematically taken as an example in FIG. 5A), a circuit board 12, a circuit board 13, and a circuit board 14. The circuit board 14 is electrically connected to the circuit board 13 through a connector 15*a*. The circuit board 13 is electrically connected to the circuit board 12 through a connector 15*b*. The circuit board 12 is electrically connected to the tiled units 11 through the part 180*b* of the first signal line 180.

Specifically, two tiled units 11 are tiled to each other, and each of the tiled units 11 includes the display panel 100, the light conversion plate 200, and the filling layer 300. The filling layer 300 is arranged between the display panel 100 and the light conversion plate 200. The display panel 100 includes the substrate 110, the light-emitting unit 120, and the first signal line 180. The part 180*b* of the first signal line 180 may penetrate the substrate 110 to thus transfer the signal sent by the circuit board 12 through the part 180*b* of the first signal line 180 to the first signal line 180 on the substrate 110. In some embodiments, the display panel 100 includes the second signal line 181. The second signal line 181 may also be designed with a through hole (not shown) penetrating the substrate 110 to also transfer the signal sent by the circuit board 12 through the through hole to the second signal line 181 on the substrate 110. In some embodiments, the light conversion plate 200 may include a color filter material, fluorescence material, phosphor material, quantum dot material, other suitable materials, or a combination thereof, but not limited thereto.

In summary of the foregoing, in the display panel of the embodiments of the disclosure, since the scan driver is closer to the central region of the substrate than the sensing driver is, and the emission driver is closer to the central region of the substrate than the sensing driver is, the transmission paths of the scan signal and the emission signal transferred to both sides of the substrate are substantially similar, accordingly reducing the distortion of the scan signal and the emission signal. In addition, in the display panel where the scan driver, the emission driver, and/or the sensing driver are arranged in the active region, the overall transmittance of the display panel can be relatively consistent by arranging the opaque pattern. Moreover, the overall transmittance of the display panel can be more consistent by arranging the opaque pattern and overlapping the first signal line and the second signal line.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display panel, comprising:

a substrate comprising an active region, and the active region comprises a gate driver arrangement region and a non-gate driver arrangement region arranged at intervals;

a light-emitting unit arranged in the gate driver arrangement region and the non-gate driver arrangement region;

a pixel circuit arranged in the gate driver arrangement region and the non-gate driver arrangement region and comprising:

a data input transistor configured to receive a data signal according to a scan signal;

a driving transistor configured to provide a driving current based on the data signal;

an emission transistor configured to transfer the driving current to the light-emitting unit according to an emission signal; and a sensing transistor configured to sense the driving current according to a sensing signal;

a scan driver arranged in the gate driver arrangement region and configured to output the scan signal;

an emission driver arranged in the gate driver arrangement region and configured to output the emission signal;

a sensing driver arranged on the substrate and configured to output the sensing signal; and an opaque pattern arranged in the non-gate driver arrangement region, wherein the pixel circuit is arranged between the scan driver and the emission driver, and the emission driver is arranged in a central region of the substrate and the sensing driver is arranged in a side region of the substrate, wherein the emission transistor is electrically coupled between the sensing transistor and the light-emitting unit, wherein an area of the opaque pattern arranged in the central region of the substrate is substantially equal to an area of the scan driver or an area of the emission driver, wherein a relative arrangement between the opaque pattern and the pixel circuit in the non-gate driver arrangement region is substantially the same as a relative arrangement between the scan driver and the pixel circuit in the gate driver arrangement region, and a transmittance of the non-gate driver arrangement region is substantially equal to a transmittance of the gate driver arrangement region.

2. The display panel according to claim 1, wherein the scan driver is arranged in the central region of the substrate.

3. The display panel according to claim 1, wherein a signal transfer path of at least one of the scan driver and the emission driver is transferring from the central region to both sides of the substrate.

4. The display panel according to claim 1, wherein the sensing driver is arranged in the gate driver arrangement region.

5. The display panel according to claim 1, wherein the substrate has a first side and a second side opposite to each other, and the scan driver and the emission driver are away from the first side and the second side.

6. The display panel according to claim 5, wherein the sensing driver is adjacent to the first side and the second side.

7. The display panel according to claim 1, wherein the area of the opaque pattern is substantially equal to an area of the sensing driver.

8. The display panel according to claim 1, wherein the side region comprises a first side region and a second side region, the first side region and the second side region are respectively arranged on opposite sides of the central region.

9. The display panel according to claim 8, wherein the sensing driver is arranged in the first side region or the second side region.

* * * * *